United States Patent [19]

Yudovin et al.

[11] Patent Number: 5,026,220
[45] Date of Patent: Jun. 25, 1991

[54] DEVICE FOR SUPPLYING LUBRICATING-AND-COOLING AGENT TO CUTTING TOOLS

[76] Inventors: Lev G. Yudovin, ulitsa Uralskaya, 10, kv. 26; Boris G. Sergeev, ulitsa Ya. Kolosa, 84, kv. 18, both of Minsk, U.S.S.R.

[21] Appl. No.: 477,825
[22] PCT Filed: Aug. 23, 1988
[86] PCT No.: PCT/SU88/00163
§ 371 Date: Apr. 23, 1990
§ 102(e) Date: Apr. 23, 1990
[87] PCT Pub. No.: WO90/02021
PCT Pub. Date: Mar. 8, 1990
[51] Int. Cl.[5] .................. B23B 41/02; B23B 51/06
[52] U.S. Cl. .................... 408/56; 408/705; 409/136; 409/137
[58] Field of Search .......... 408/56, 57, 59, 705, 408/72 RB; 409/135, 136, 137

[56] References Cited

U.S. PATENT DOCUMENTS 4,377,023 3/1983 Boesch ........................ 408/56 X
4,568,226 2/1986 Gottschalk et al. ............ 408/56

FOREIGN PATENT DOCUMENTS 252611 1/1988 European Pat. Off. .
869256 1/1942 France .
823077 5/1981 U.S.S.R. .

Primary Examiner—Steven C. Bishop
Attorney, Agent, or Firm—Burgess, Ryan & Wayne

[57] ABSTRACT

The herein-proposed device includes a housing (1) provided with a hole (2) adapted to receive an arbor (3) carrying a cutting tool (4), a seal (8) mounted on the housing (1) in the zone of interaction between the cutting tool (4) and a workpiece (6) to be machined, pipings (16, 18) adapted for the supply and withdrawal of coolant, respectively, and a chip disposal opening (10). The device is provided with a safety valve (19) installed on the coolant supply piping (18). The housing (1) is provided with a seal (5) arranged in the zone of location of the arbor (3). The chip disposal opening (10) and a space (9) of the housing (1) are arranged on the opposite sides with respect to an end face (11) of the housing (1) in the zone of interaction between the cutting tool (4) and the workpiece (6) to be machined.

2 Claims, 1 Drawing Sheet

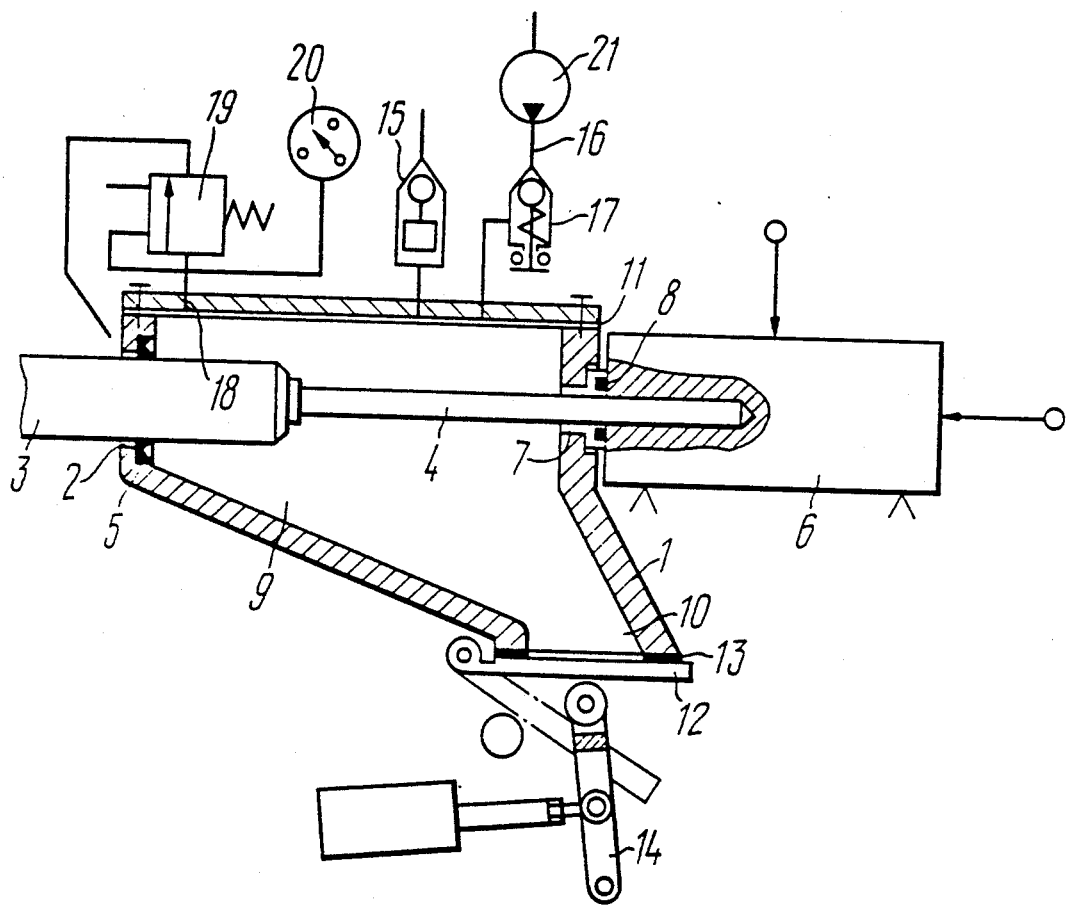

DEVICE FOR SUPPLYING LUBRICATING-AND-COOLING AGENT TO CUTTING TOOLS

FIELD OF THE INVENTION

The present invention relates generally to metal machining and more specifically to a device for supply of a coolant to cutting tools.

The herein-proposed invention finds particular utility when employed for deep-hole drilling with the aid of twist drills.

BACKGROUND OF THE INVENTION

At the present time, the practice of deep-hole drilling with the use of twist drills is characterized by low cutting speeds and fast wear of the cutting tool. This is concerned with the fact that with greater drilling depths, difficulties are encountered in supplying coolant to the cutting lips of the twist drill.

Widely known in the present state of the art is a device for the supply of a lubricating-and-cooling agent (hereinafter referred to as "coolant" to the comprising a bath filled with coolant, wherein a workpiece to be machined is accommodated and secured so that the level of coolant is higher than the hole to be drilled (cf., a textbook "Unit-built Machine Tools" by G. I. Melamed et al., 1964, "Mashgiz" Publishers, Moscow, (in Russian).

With low drilling depths, coolant readily flows to the hole being machined, whereby the drill cutting lip are lubricated and cooled down. In deep-hole drilling, the drill operates virtually dry because a steam "cushion" produced at the drill point prevents coolant from getting to the cutting lips, and the twist drill, which operates as a "screw pump", tends to pump coolant out of the hole. The joint action of these factors results in the need to withdraw, at regular intervals, the drill from the hole being machined, thus reducing the machining efficiency.

Known presently is another device for the supply of coolant under pressure to the cutting tool in the machining zone, comprising a housing hermetically sealed by a cover having an opening provided with a seal and adapted to receive an arbor carrying the cutting tool (cf. "Proceedings of Higher Educational Institutes", "Machinostroyeniye" Publishers, Issue No. 12, 1969, Moscow, "Cutting Processes Under High Static Pressures of Coolant" by V. M. Yaroslavtsev, V. V. Sabel'nikov, pp. 172-176 (in Russian). The workpiece to be machined is arranged inside the housing. Coolant under the required pressure is fed by a pump into the housing. High pressure developed inside the housing enables the coolant to penetrate directly to the tool cutting lips, which considerably increases its endurance.

However, the arrangement of the workpiece to be machined inside the pressurized housing involves substantial time wasted on depressurization, removal and positioning of the workpiece to be machined, filling the housing with coolant and its pressurization, which significantly reduces the process efficiency, while the provision of a high-lift pump renders the construction more expensive and sophisticated.

Still another device for supplying a lubricating-and-cooling agent to the cutting tool is known to comprise a housing with an opening adapted to receive an arbor with the cutting tool, a seal mounted on the housing in the zone of interaction between the cutting tool and the workpiece being machined, pipes for the coolant to be fed to and discharged from the housing, and an opening for chip disposal communicating with the housing space (cf. German Patent No. 747,139). The housing is made in the form of a bell resting with its lower portion on the surface of the workpiece being machined.

Coolant is fed into the housing through a coolant supply pipe union turned into the housing. The chip disposal opening and the coolant drain-out opening are arranged above the supply pipe union. The position of the chip disposal opening determines the height of the coolant column. Static pressure produced by the coolant column causes the coolant to penetrate into the holes being machined, thus increasing the cutting tool endurance.

However, the latter device described hereinbefore fails to produce a sufficiently high coolant pressure due to the fact that the housing is not pressurized, and the amount of pressure is only determined by the height of the coolant column which, in turn, is restricted by the housing dimensions. This results in low drilling efficiency. Besides, the device mentioned above is only practicable for vertical drilling.

SUMMARY OF THE INVENTION

The present invention is aimed at the provision of a device for supplying coolant to the cutting tool, which is made in such a way as to ensure a high static coolant pressure without the use of a high-lift pump, and is applicable for both horizontal and vertical drilling of workpieces having an arbitrary size and shape.

The above-said object is accomplished by a device for supplying coolant to the cutting tool, comprising a housing having a hole adapted to receive an arbor carrying a cutting tool, a seal mounted on the housing in the zone of interaction between the cutting tool and the workpiece being machined, a piping for the supply of coolant into the housing, a piping for the discharge of coolant from the housing, and a chip disposal opening communicating with the housing space, according to the invention, the coolant withdrawal piping is provided with a safety valve, the housing is provided with a seal arranged in the zone of the arbor location, while the chip disposal opening and the housing space are arranged on the opposite sides of the housing end face in the zone, where the cutting tool interacts with the workpiece being machined.

The herein-proposed device makes it possible to increase the efficiency of hole machining in workpieces of an arbitrary size and shape using cutting tools, and to extend cutting tool endurance. This is accomplished by the lubricating-and-cooling agent, under the action of a substantially high static pressure produced within the housing, which is urged to penetrate to the cutting tool lips during both vertical and horizontal machining. Since the workpiece to be machined is arranged outside the housing, its dimensions and shape have virtually no effect on the dimensions and volume of the housing.

It is expedient that a float valve be mounted on the housing, and an electric-contact check valve be installed on the coolant supply pipe.

Such an arrangement enables fully automatic control of the processes of filling the housing with coolant, air bleeding, pressurization of the housing, and feed motion of the cutting tool.

BRIEF DESCRIPTION OF THE DRAWING

In what follows the present invention will now be disclosed in a detailed description of an illustrative embodiment thereof with reference to the accompanying drawing, which is a diagrammatic view of a device for supply of coolant to the cutting tool.

The sole FIGURE is an elevational view in partial section of an embodiment of the invention.

DETAILED DESCRIPTION OF THE INVENTION

The herein-proposed device comprises a housing 1 provided with a hole 2 adapted to receive an arbor 3 carrying a cutting tool 4. The hole 2 has a seal 5 for the arbor 3. A jig bush 7 having a seal 8 is installed in the housing 1 in the zone of interaction between the cutting tool 4 and a workpiece 6 to be machined. A space 9 of the housing 1 is associated with an opening 10 for chip disposal. The chip disposal opening 10 and the housing space 9 are arranged on opposite sides with respect to an end face 11 of the housing 1, in the zone of interaction between the cutting tool 4 and the workpiece 6 to be machined. The opening 10 is provided with a cover 12 adapted to hermetically close the opening 10 in the course of operation, through the agency of a seal 13. Closing and opening of the cover 12 is effected by a mechanism 14.

To provide for fully automatic control over the filling of the housing 1 with coolant, air bleeding, pressurization of the housing 1, and engagement of feed motion of the cutting tool 4, the herein-proposed device is provided with a float valve 15 installed vertically on the housing 1. Besides, an electric-contact check valve 17 is installed on a coolant supply pipeline 16. A safety valve 19 and a pressure gauge 20 are installed on a coolant discharge pipeline 18.

The herein-proposed device operates as follows.

In the initial position, the arbor 3 is enclosed in the seal 5, the workpiece 6 is held against the seal 8, and the cover 12 is closed.

A supply pump 21 fills the inner space 9 of the housing 1 with coolant, via the electric-contact check valve 17, thus expelling the air through the float valve 15. After the housing 1 has been filled up, coolant finds its way to the float valve 15, the float comes to the surface so that the valve 15 is closed. The pressure within the housing 1 and that in the coolant supply pipeline 16 become equal and the electric-contact check valve 17 is closed, whereby a signal is delivered to engage the feed motion of the cutting tool 4. As the arbor 3 is drawn into the hermetically closed housing 1, the coolant contained in the housing 1 is compressed, whereby the pressure in the housing 1 builds up to the pressure setting of the safety valve 19. As soon as the preset pressure has been reached, the pressure gauge 20 operates to stop the supply pump 21. In case where the coolant pressure drops in the course of machining, the pressure gauge 20 disengages the feed motion of the cutting tool 4.

Once the machining process has been completed, the arbor 3 with the cutting tool 4 are withdrawn into the initial position, and the mechanism 11 opens the cover 9, while chip and coolant are removed from the housing 1 through the opening 10. After replacement of the workpiece 6 to be machined, the cover 9 is closed and the entire cycle is repeated.

The herein-proposed device for supply of coolant to the cutting tool makes ti possible to increase the efficiency and accuracy of machining holes with blade-type tools, and, simultaneously, to extend the endurance of the cutting tool applied. Besides, the proposed device can be used for both vertical and horizontal maching of workpieces of arbitrary dimensions and shapes.

INDUSTRIAL APPLICABILITY

The herein-proposed invention finds particular utility when employed for deep-hole drilling with the aid of twist drills.

We claim:

1. A device for supplying coolant to a cutting tool comprising:
   a housing defining a space and having an end face, a hole adapted to receive an arbor carrying a cutting tool, a first seal mounted on the end face in a zone of interaction between the cutting tool and a workpiece being machined, a first piping for transporting coolant to the housing, a second piping for withdrawing coolant from the housing, a chip disposal opening communicating with the space, said opening and said space arranged on opposite sides with respect to the end face of the housing in the zone of interaction, a safety valve operatively connected to the second piping, and a second seal in the hole adapted to receive the arbor.

2. The device of claim 1 further comprising a float valve and an electric-contact check valve operatively connected to the first piping.

* * * * *